United States Patent
Krishnamoorthy

(10) Patent No.: US 9,571,018 B2
(45) Date of Patent: Feb. 14, 2017

(54) METHOD AND APPARATUS FOR WINDOWLESS BEMF DETECTION

(71) Applicant: Marvell World Trade Ltd., St. Michael (BB)

(72) Inventor: Ravishanker Krishnamoorthy, Singapore (SG)

(73) Assignee: Marvell World Trade Ltd., St. Michael (BB)

(*) Notice: Subject to any disclaimer, the term of this patent is extended or adjusted under 35 U.S.C. 154(b) by 239 days.

(21) Appl. No.: 14/057,897

(22) Filed: Oct. 18, 2013

(65) Prior Publication Data
US 2014/0111131 A1    Apr. 24, 2014

Related U.S. Application Data

(60) Provisional application No. 61/717,876, filed on Oct. 24, 2012.

(51) Int. Cl.
*H02P 6/182* (2016.01)
*H02P 6/18* (2016.01)

(52) U.S. Cl.
CPC .................... *H02P 6/182* (2013.01)

(58) Field of Classification Search
CPC ........................................ H02P 6/182
USPC ..................... 318/400.35, 472, 811
See application file for complete search history.

(56) References Cited

U.S. PATENT DOCUMENTS

| 5,783,917 A * | 7/1998 | Takekawa | H02P 6/182 318/400.1 |
| 6,121,736 A | 9/2000 | Narazaki et al. | |
| 2005/0093498 A1* | 5/2005 | Hill | H02K 29/08 318/400.04 |
| 2006/0055352 A1* | 3/2006 | Mori | H02P 6/10 318/432 |
| 2006/0158142 A1* | 7/2006 | Kurosawa | G11B 19/28 318/400.35 |
| 2007/0241718 A1 | 10/2007 | Viti | |
| 2013/0088290 A1* | 4/2013 | Rapp | H03F 3/217 330/2 |

FOREIGN PATENT DOCUMENTS

JP    2005102447    4/2005

OTHER PUBLICATIONS

PCT Search Report and Written Opinion mailed Mar. 6, 2015 for PCT Application No. PCT/IB2013/002354, 7 Pages.

* cited by examiner

*Primary Examiner* — Shawki S Ismail
*Assistant Examiner* — Muhammad S Islam

(57) ABSTRACT

A zero crossing of a motor current waveform at the terminal of a brushless sensor-less multi-phase DC motor is determined without opening a non-drive period while the motor is continuously driven. A voltage level at a first threshold at the terminal of a motor is detected. At a first time, a current flow switch connected to the terminal is switched. At a second time, a voltage level at a second threshold is detected at the terminal of the motor. The zero crossing is determined between the first time and the second time and used to synchronize the driving of the motor.

17 Claims, 7 Drawing Sheets

| Time | Current Direction | P-Switch 408 | N-Switch 412 | Vout 414 |
|---|---|---|---|---|
| A | Positive | Off | On | V4 |
| B | Positive | Off | Off | V1 |
| C | Positive | On | Off | V2 |
| D | Positive | Off | Off | V1 |
| E | Positive | Off | On | V4 |
| F | Negative | Off | On | V5 |
| G | Negative | Off | Off | V6 |
| H | Negative | On | Off | V3 |
| I | Negative | Off | Off | V6 |
| J | Negative | Off | On | V5 |
| K | Negative | Off | Off | V6 |

Fig. 5

METHOD AND APPARATUS FOR WINDOWLESS BEMF DETECTION

CROSS REFERENCE TO RELATED APPLICATIONS

This claims priority to U.S. Patent Application No. 61/717,876, filed on Oct. 24, 2012, which is incorporated herein by reference.

TECHNICAL FIELD

Embodiments of the present disclosure relate to the field of direct current (DC) motors, and in particular to controlling DC motors.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Direct current (DC) motors, including brushless DC motors (BLDC), commonly require electronic circuitry to control commutation for driving the motor. There are multiple ways to drive a DC motor. One method for driving a DC motor is to use one or more Hall sensors to detect a motor pole position to determine how and when to drive appropriate phases (i.e., terminals) of the motor to keep the motor spinning.

FIG. 1 illustrates an example environment 100 comprising a simplified model of a 3 phase motor 102. Motor 102 is illustrated as having three coils 104, 106 and 108 arranged in three directions corresponding to terminals for phases A 110, B 112 and C 114, respectively. In an ideal 3 phase motor, terminals for phases A, B and C are positioned 120° apart. Rotor 118 is represented as a bar magnet with its rotary axis at the intersection of phases A 110, B 112 and C 114, and perpendicular to the plane of the axes associated with the phases. The rotational position of rotor 118 can be controlled by driving a configuration of currents through coils 104, 106 and 108 at the terminals of phases 110, 112 and 114, respectively. FIG. 1 illustrates motor 102 equipped with Hall sensors 120, 122 and 124 used to detect actual positions (i.e., pole positions) of rotor 118. The actual pole positions are commonly used by control circuitry to determine how to drive phases A, B and C. In an ideal motor, Hall sensor 120 would be located rotationally half-way between the terminals of phases A 110 and B 112; Hall sensor 122 would be located rotationally half-way between the terminals of phases B 112 and C 114; and Hall sensor 124 would be located rotationally half-way between the terminals of phases C 114 and 110.

The motion of rotor 118 induces alternating voltages called Back Electro-Motive Force (BEMF) within coils 104, 106 and 108. The amplitude of the BEMF voltage is generally proportional to the angular velocity of rotor 118. Hall sensors are precisely mounted in such a way that a zero crossing of a BEMF voltage waveform occurs as close as possible to a zero crossing of the Hall sensor signal associated with a corresponding coil.

Another method for controlling a DC motor is a "sensor-less method" that does not rely on the use of precisely positioned Hall sensors. In the "sensor-less method", the drive of motor 102 on one or more terminals A 110, B 112 and C 114 is stopped for a short period, commonly referred to as a "window", in order to monitor the BEMF voltage of the motor. The zero crossing of the BEMF voltage on one or more phases of the motor will provide information on the pole position, which is commonly used to determine how to drive the appropriate terminals of the motor to keep the motor running.

FIG. 2 illustrates a "sensor-less method" of determining a zero crossing of the BEMF voltage on one or more phases of motor 102. In an ideal 3 phase motor, the BEMF voltages of phases A 110, B 112 and C 114 are sinusoidal and out of phase by 120° relative to each other. To drive motor 102 in synchronization with the BEMF voltage on each phase of motor 102, to maximize efficiency of motor 102, a reference for BEMF signals on each phase may be used. If the BEMF signals on each of phases A 110, B 112 and C 114 are exactly 120° apart relative to each other, and they each have a sinusoidal waveform with a same amplitude, then detection of the BEMF signal on only one phase (e.g., phase A 110) may be used, as BEMF waveforms on other phases may be extrapolated from the zero crossing detected on the one phase.

As shown in FIG. 2, phase A 110 is driven in a windowed fashion, while phases B 112 and C 114 are driven in a continuous, non-interrupted windowless fashion. At points near a zero crossing of the phase A BEMF voltage waveform, as illustrated in FIG. 2, a driving of phase A is stopped to open a window, so that the phase A BEMF voltage may be observed to detect a precise time of its zero crossing. This precise time is used to extrapolate appropriately synchronized continuous driving of phases B 112 and C 114, as well as synchronized windowed driving of phase A 110.

SUMMARY

In various embodiments, the present disclosure provides a method and apparatus to detect motor Back Electro-Motive Force (BEMF) without using sensors and without opening a non-drive period (i.e., a window). Voltage levels are monitored at a motor terminal to determine a direction of motor current flow and a zero crossing of a motor current waveform is determined and used for motor synchronization.

This Summary and the following sections, including the section headings, are merely illustrative implementations and embodiments and should not be construed to limit the scope of the claims.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 5 is a table that illustrates example relationships between motor current direction, circuit switch states and voltages for various time durations.

DETAILED DESCRIPTION

For driving a motor in a windowed fashion, the windowed, non-driving period needs to be wide enough to detect the BEMF zero crossing reliably. Motor to motor mismatch as well as pole to pole mismatch within the same motor may require a wider window opening compared to motors without mismatch.

Regarding the "sensor-less method" of windowed motor driving, since the motor is not driven during each window period, the maximum energy delivered to the motor is limited by the window size. Hence, the maximum achievable speed with all other conditions the same, will be lower for the window method. Also, during the non-driving period when a window is opened, the motor current is disturbed (which would otherwise be a pure sine wave), which can cause motor jitter, acoustic noise and limit the total energy to the motor, thus limiting its maximum achievable speed.

Regarding the use of Hall sensors, using Hall sensors to detect a motor pole position is expensive, as sensors must be precisely placed. Motor to motor mismatch, as well as pole to pole mismatch within the same motor, would require that sensors be custom placed, further increasing motor manufacturing expenses. Thus, in various embodiments, the present disclosure describes techniques for driving motors in a windowless fashion without the use of sensors.

Figure 3:
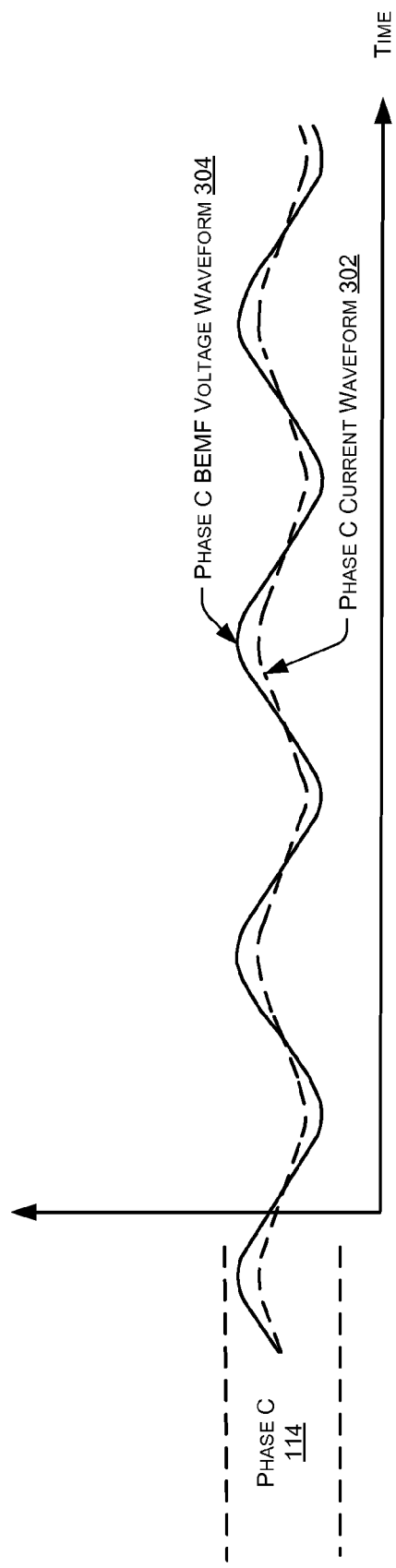
FIG. 3 illustrates an example relationship between a BEMF voltage waveform and a motor current waveform.

FIG. 3 illustrates a relationship between a BEMF voltage waveform 304, and a corresponding motor current waveform 302, for a motor phase (e.g., phase C 114) driven in a windowless fashion using, for example, sinusoidal commutation and pulse width modulation (PWM). As illustrated in FIG. 3, the phase C current waveform 302 is sinusoidal and in phase with the phase C BEMF voltage waveform 304. Since the BEMF voltage waveform 304 and current waveform 302 are aligned, the zero cross point of the current waveform 302 is the same as the zero cross point of the BEMF voltage waveform 304. However, the BEMF voltage waveform 304, as well as its zero crossing, may only be directly detected by stopping the drive of phase C 114. In contrast, the current waveform 302, as well as its zero crossing, may be detected without stopping the drive of the terminal at phase C 114, or a terminal at any other phase of motor 102.

Thus, FIG. 3 illustrates that the zero crossing point of the BEMF voltage waveform 304 is determined by determining the zero crossing point of current waveform 302. Consequently, detection of the zero crossing point of current waveform 302 allows for windowless detection of the zero crossing point of BEMF voltage waveform 304 in a sensor-less motor.

Figure 4:
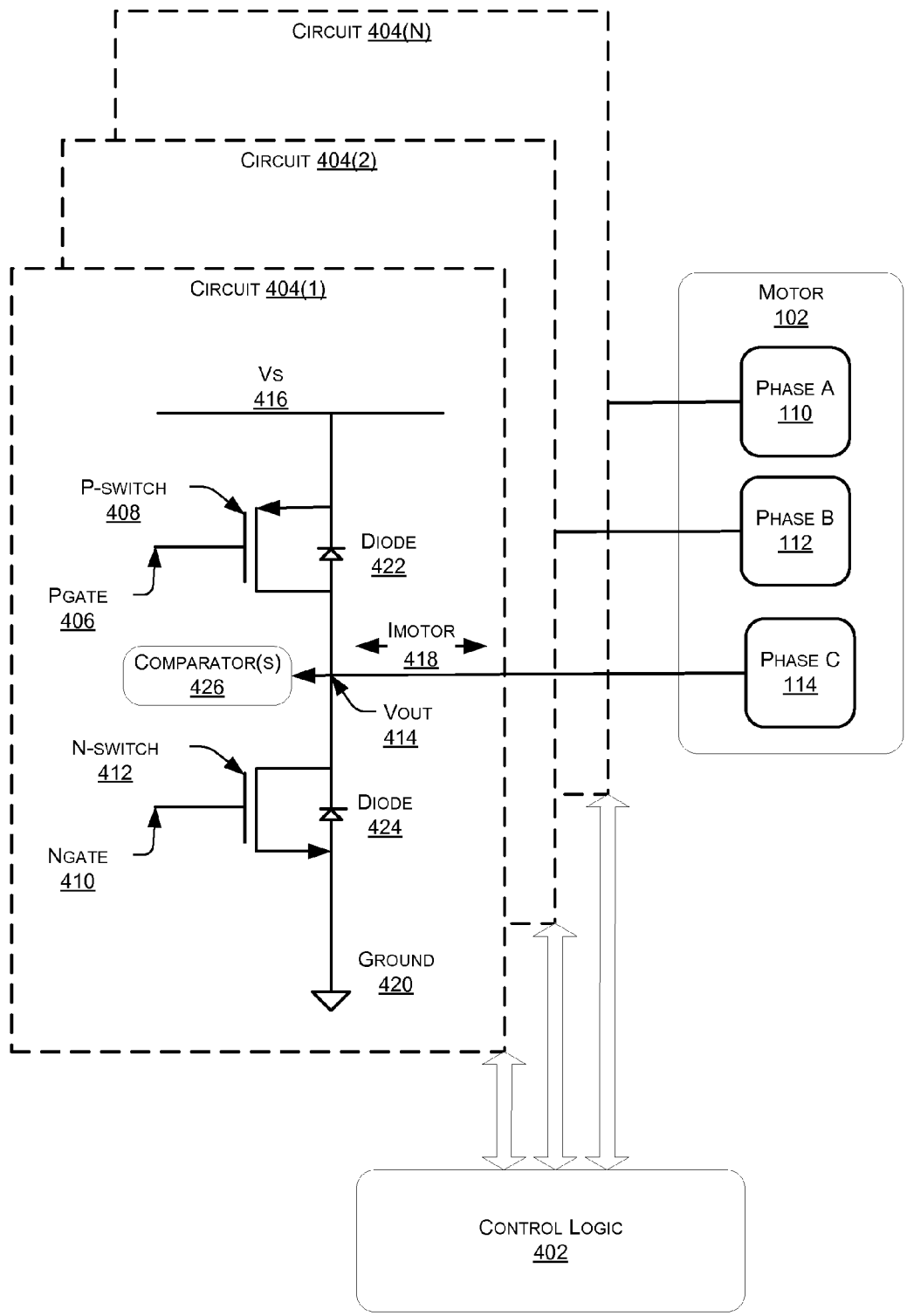
FIG. 4 schematically illustrates an example system for controlling a motor in a windowless fashion.

FIG. 4 illustrates an example architecture 400 of control logic 402 and example circuitry 404 for controlling sensor-less motor 102 and detecting motor BEMF zero crossings in a windowless fashion (i.e., without opening a non-drive period on any phase of motor 102). Motor 102 is shown in FIG. 4 as having 3 phases. However, a motor having a different number of phases is within the scope of this disclosure.

Control logic 402 may include memory, one or more processors, commutation logic, motor pole mismatch compensation logic, fault detection logic, computation logic, state machine logic, digital signal processing (DSP) logic, analog hardware components, digital logic, software, firmware, or the like.

Control logic 402 may be configured to interface with and control circuits 404(1-N). As an example, control logic 402 is configured to control and/or drive Pgate 406 of p-switch 408 and Ngate 410 of N-switch 412, monitor voltage levels at Vout 414 of circuit 404(1), and detect and process comparison signals from comparator(s) 426. Control logic 402, in conjunction with circuit(s) 404, is configured to determine motor BEMF zero crossings to drive each phase of sensor-less motor 102 with an appropriately phased drive signal (e.g., drive signals for each of the three phases are sinusoidal and out of phase by 120 degrees with each other).

Circuitry 404(1-N) may be integrated with control logic 402, external to control logic 402, or combinations thereof. In the example architecture of FIG. 4, for illustrative purposes, a separate circuit 404 is shown connected to a terminal of each phase of motor 102. This is shown merely for simplicity of discussion, and should not be construed as a limitation, as numerous other configurations are possible. In an embodiment, each of circuits 404(1-N) is essentially identical in functionality. In an embodiment, a circuit 404 connected to a terminal of each phase of motor 102 compensates for motor to motor mismatch and/or pole to pole mismatch within the same motor, greatly reducing motor manufacturing costs.

For purposes of discussion, sample circuit 404(1) is shown connected to a terminal of phase C 114 of motor 102. Circuit 404(1) may operate similarly as described herein if connected to any phase 110-114 of motor 102. In circuit 404(1), Imotor 418 represents a motor current flowing between circuit 404(1) and the terminal at phase C 114 of motor 102. Vout 414 represents detectable voltage levels at the terminal of phase C 114. As an example, P-switch 408 includes a p-channel metal-oxide-semiconductor (PMOS) transistor, however, this should not be construed as a limitation. P-switch 408 may include numerous other types of transistors (e.g., field-effect-transistor (FET), MOSFET, JFET, bipolar junction transistor (BJT), etc.) or circuit configurations. Likewise, N-switch 412 may include an n-channel metal-oxide-semiconductor (NMOS) transistor, however, as with P-switch 408, this should not be construed as a limitation.

As an example, a source of p-switch 408 is connected to a power source Vs 416, with its drain connected to a drain of n-switch 412. A source of n-switch 412 is connected to ground 420. A diode 422 is shown in FIG. 4 connected across the source and drain of p-switch 408, and a diode 424 is shown connected across a drain and source of n-switch 412. As an example, p-switch 408 and n-switch 412 are collectively referred to as current flow switches that are connected to a terminal (i.e., phase) of the motor. Comparator(s) 426 monitor one or more voltage levels of Vout 414. Comparator(s) 426 may be part of circuit 404, part of control logic 402, external to circuit 404 and/or control logic 402, or combinations thereof. As an example, comparator(s) 426 are configured to detect when a voltage level of Vout 414 goes above a first threshold and/or below a second threshold. As another example, comparator(s) 426 are configured to detect when a voltage level of Vout 414 goes above and below numerous pre-specified threshold levels, such that control logic 402 determines patterns of voltage levels of Vout 414 over time.

As an example, control logic 402 is configured to determine when to turn p-switch 408 on or off by applying appropriate voltages at pgate 406, and determine when to turn n-switch 412 on or off by applying appropriate voltages at ngate 410 based at least in part on voltage levels detected by comparator(s) 426. As an example, if both p-switch 408 and n-switch 412 are switched off (e.g., current flow switches of the circuit are switched off), such that current cannot flow through the switches, when motor current Imotor 418 is positive (e.g., motor current is flowing into circuit 404(1) from motor 102), the voltage Vout 414 is equal to Vs 416 plus the voltage drop across diode 422 (e.g., Vout 414 is greater than supply voltage Vs 416). Conversely, continuing this example, if both p-switch 408 and n-switch 412 are turned off, when motor current Imotor 418 is negative (e.g., motor current is flowing from circuit 404(1) into motor 102), the voltage Vout 414 is equal to the voltage drop across diode 424 (e.g., a negative voltage). As an example, comparator(s) 426 detect voltage levels of Vout 414 at a first threshold indicative of a positive current flow, and at a second threshold indicative of a negative current flow. For purposes of this disclosure, circuits 404(1-N), comparator(s) 426 and control logic 402 are collectively referred to as a circuit with logic.

Figure 6:
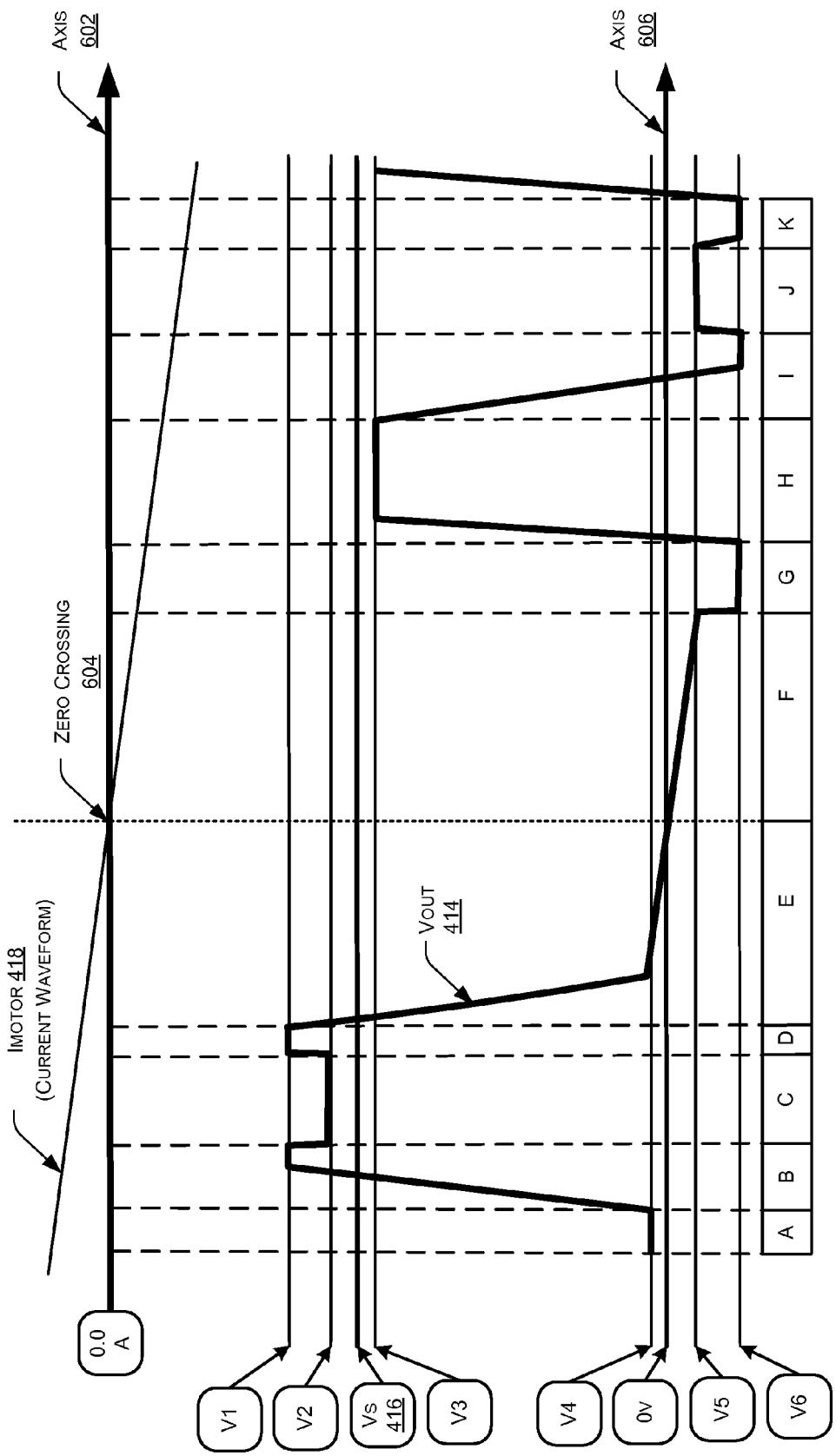
FIG. 6 graphically illustrates example voltage and current relationships in a motor associated with the table in FIG. 5.

FIGS. 5 and 6 illustrate various voltage levels of Vout 414 during operation of motor 102 under various on/off states of p-switch 408 and n-switch 412. FIG. 5 is an example table that illustrates, for various times A-K (e.g., individual time durations), positive and negative current directions for Imotor 418 during operation of motor 102 under various on/off states of p-switch 408 and n-switch 412 that correspond with various voltage levels for Vout 414. As an example, referring to FIG. 4, at time "A", with a positive current direction for current Imotor 418, with p-switch 408 off and n-switch 412 on, a voltage V4 is measured at Vout 414. In this example, V4 corresponds to a relatively low positive voltage, such as a voltage drop across open n-switch 412 of FIG. 4. As another example, at time "D", with a positive current direction for current Imotor 418, with p-switch 408 switched off and n-switch 412 off, Vout 414 transitions from a voltage level of V2 to a voltage level of V1. In this example, V1 corresponds to a relatively high positive voltage, such as a voltage drop across diode 422 plus supply voltage Vs 416 of FIG. 4.

Referring to FIG. 5, note that the current direction of Imotor 418 transitions from positive to negative between time durations E and F. Therefore, the transition between time durations E and F is considered a zero crossing of the motor current waveform. As discussed herein, this motor current waveform zero crossing coincides with a zero crossing of a corresponding BEMF voltage waveform used to phase synchronize a signal driving a corresponding phase, or phases, of a motor.

FIG. 6 is an example chart graphically illustrating current directions for Imotor 418 and voltage levels for Vout 414 at various time durations A-K for switch states of p-switch 408 and n-switch 412 as shown in FIG. 5. The top of FIG. 6 represents an illustrative current graph for Imotor 418 at times A-K relative to horizontal axis 602 referenced at 0.0 amps (A). The current graph illustrates that the current direction for Imotor 418 is positive at times A-E. Between time durations E and F, Imotor 418 goes through a zero crossing 604 at 0.0 A, such that a current direction for Imotor 418 reverses direction and is negative at times F-K. Below the current graph of FIG. 6 is a corresponding voltage graph shown relative to horizontal axis 606 at 0 volts (V).

The voltage graph illustrates voltage levels for Vout 414 at various time durations A-K for switch states of p-switch 408 and n-switch 412 as shown in FIG. 5 during operation (e.g., spinning, driving) of motor 102. The voltage graph represented in FIG. 6 illustrates Vout 414 during a continuous (e.g., windowless) driving of motor 102, using, for example, a pulse width modulated (PWM) driving signal. As an example, the PWM driving signal has one or more duty cycles such that a resultant BEMF voltage waveform and motor current waveform on a phase of a motor are sinusoidal and in phase, as illustrated in FIG. 3.

As shown in FIG. 6, the voltage graph illustrates a pattern of voltage levels measurable at Vout 414 that correlate to switch states of p-switch 408 and n-switch 412 at corresponding time durations A-K. FIG. 6 illustrates various positive voltage levels V1, V2, Vs 416, V3 and V4 above 0V, and various negative voltage levels V5 and V6 that are below 0V. As an example, control logic 402 is configured to control each time duration A-K, as well as the on/off state of the current flow switches (e.g., p-switch 408 and n-switch 412).

In an embodiment, in reference to FIG. 4, p-switch 408 has a threshold voltage level that is lower than a threshold voltage level of diode 422, and n-switch 412 has a threshold voltage level that is lower than a threshold voltage level of diode 424. With reference to FIGS. 4, 5 and FIG. 6, an example of this embodiment will be described below.

At time duration A, as indicated on the current graph of FIG. 6, current Imotor 418 is positive (e.g., current is flowing into circuit 404 from motor 102 on phase C) with p-switch 408 off and n-switch 412 on. As an example, voltage level V4 represents a voltage drop across n-switch 412. At the beginning of time duration B, n-switch 412 is switched off such that, as indicated in FIG. 5, both n-switch 412 and p-switch 408 are off. Subsequently, as illustrated in FIG. 6, Vout 414 rises above supply voltage level Vs 416 to voltage level V1. As an example, diode 422 is on and voltage level V1 equals Vs 416 plus the voltage drop across diode 422. At the end of time duration B and at the beginning of time duration C, p-switch 408 is switched on, resulting in Vout 414 transitioning to voltage level V2, such that Vs<V2<V1. As an example, diode 422 is off and V2 equals Vs plus the voltage drop across p-switch 408. At the start of time duration D, p-switch 408 is switched off, and Vout 414 again rises to voltage level V1. At the start of time duration E, n-switch 412 is switched on. However, since current Imotor 418 is still positive, Vout 414 drops initially towards ground (i.e., 0V) to V4, as current flow is transitioning from positive to negative. At a boundary between E and F, current flow transitions from positive to negative, and current switch states remain unchanged (e.g., n-switch 412 stays on during time duration F). During time duration F, current is going out of circuit 404 and into motor 102 (i.e., Imotor 418 is negative), and Vout 414 is below 0V. At the beginning of time duration G, n-switch 412 is switched off and Vout 414 falls below voltage level V5 to voltage level V6. As an example, current flows into the motor through diode 424. At the start of time duration H, p-switch 408 is switched on, and Vout 414 goes to voltage level V3, which is below Vs 416. As an example, V3 equals Vs 416 minus a voltage drop across p-switch 408. At the beginning of time duration I, p-switch 408 is switched off, and the Vout 414 drops again to V6. At the beginning of time duration J, n-switch 412 is switched on, and the Vout 414 rises to V5. At time K, n-switch 412 is switched off, and the Vout 414 drops again to V6. As an example, control logic 402 controls a beginning and end of time durations A-K as well as current flow switch states.

FIG. 6 illustrates various associations between voltage level patterns and current flow directions. As an example, when both current flow switches (e.g., p-switch 408 and n-switch 412) are switched off, if Vout 414 is greater than V2, then current flow is positive (e.g., the motor current waveform has a positive polarity), and if Vout 414 is less than V5, then current flow is negative (e.g., the motor current waveform has a negative polarity). FIG. 6 further illustrates that when both current flow switches are switched off, if Vout 414 is greater than Vs 416, then current flow is positive, and if Vout 414 is less than 0V, then current flow is negative. FIG. 6 further illustrates, as shown in time duration G and H, that when transitioning from both current flow switches off to p-switch 408 being switched on, that Vout 414 not rising to Vs 416 indicates that current flow is negative. Thus, since control logic 402 knows and/or controls when each of time durations A-K occur, numerous configurations of comparators 426 may be utilized for control logic 402 to pattern match the voltage waveform of FIG. 6 to detect when current flow is positive or negative, as well as when zero crossings 604 of a motor current waveform occur.

In an embodiment, since a direct precise measurement of the exact time when Vout 414 equals 0V is difficult to determine due to noise and other factors, control logic 402 pattern matches the voltage waveform in FIG. 6 and uses a known point to determine when zero crossings 604 of a motor current waveform occurs. As an example, comparators 426 comprise a first comparator to detect Vout 414 at a first threshold between V2 and V1 and a second comparator to detect Vout 414 at a second threshold between V5 and V6, such that control logic 402 uses comparators 426 to detect whether current flow is positive or negative when current flow switches are switched off. As an example of determining zero crossing 604 of a motor current waveform of Imotor 418, control logic 402 maintains a first time (e.g., $T_1$) at the end of time duration D, and a second time (e.g., $T_2$) at the beginning of time duration G, and determines zero crossing 604 to occur at a known point in time between the first time $T_1$ and the second time $T_2$. As an example, the known time (e.g., known point) of zero crossing 604 is determined as $(T_2-T_1/2)$. As another example, the known time of zero crossing 604 is determined by known characteristics of a voltage pattern of Vout 414 over time corresponding to various switch states occurring over various time durations. Thus, in this example, the known time (e.g., known point) of zero crossing 604 is determined as $(T_2-T_1/x)$, where x is a known number, and $T_1$ and $T_2$ are times associated with a first time duration, and a second time duration, respectively.

Numerous other embodiments exist for control logic 402 to use comparators 426 to determine Imotor 418 current flow direction as well as for control logic 402 to use known time durations A-K to determine a known point in time that corresponds to zero crossing 604.

In an embodiment, as part of continuously driving each phase of a motor in a windowless fashion, such as via PWM, control logic 402 repeats multiple cycles of time durations A, B, C and D before detecting zero crossing 604 at a known point in time durations E and F, followed by repeating multiple cycles of time durations G, H, I, J and K. In an alternate embodiment, as part of continuously driving each phase of a motor in a windowless fashion, such as via PWM, control logic 402 repeats multiple cycles of time durations A-K, detecting zero crossing 604 at a known point in time durations E and F for each of the cycles. Other embodiments, combinations of repetitions of time durations A-K are possible to detect zero crossing 604 at a known point in time between a first known time and a second known time.

Using the techniques described herein, all phases of a sensor-less motor may be driven continuously thereby delivering more power to the motor. Furthermore, since a non-drive period does not have to be opened to detect BEMF zero crossings for drive signal synchronization, a conventional motor can run faster using a conventional power supply. Additionally, the motor is less noisy during operation since there are no abrupt changes due to starting and stopping driving of the motor by opening a window to look for BEMF zero crossings. The techniques described herein may be applied to each phase of a motor since driving does not have to be stopped on any of the phases, alleviating problems with pole-to-pole and motor-to-motor mismatches. Also, changes that occur in motors over time can be tracked by the techniques described herein.

Figure 7:
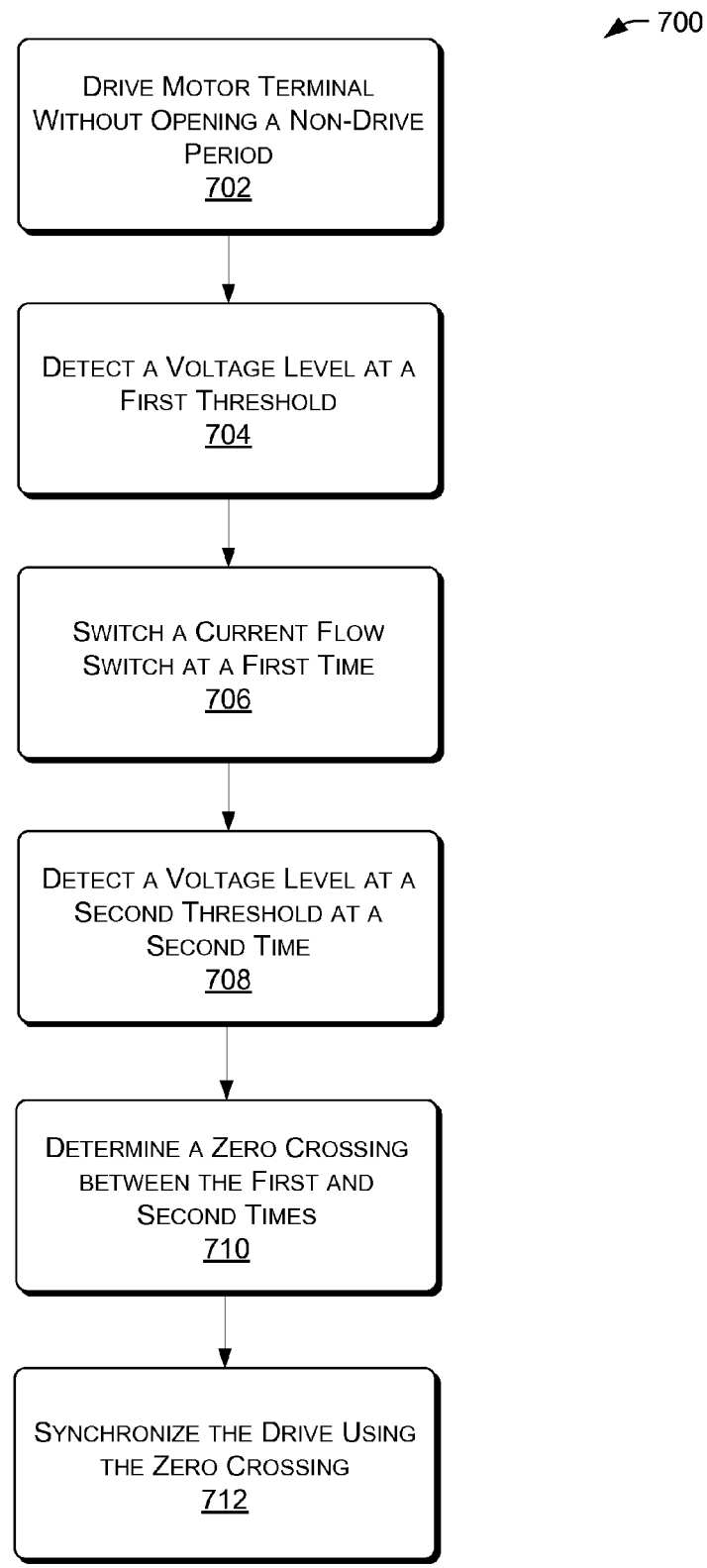
FIG. 7 is a flow diagram that describes a method in accordance with one embodiment.

FIG. 7 illustrates an example method 700 of synchronously driving a motor, such as a brushless, sensor-less, multi-phase DC motor, in a windowless fashion.

Figure 1:
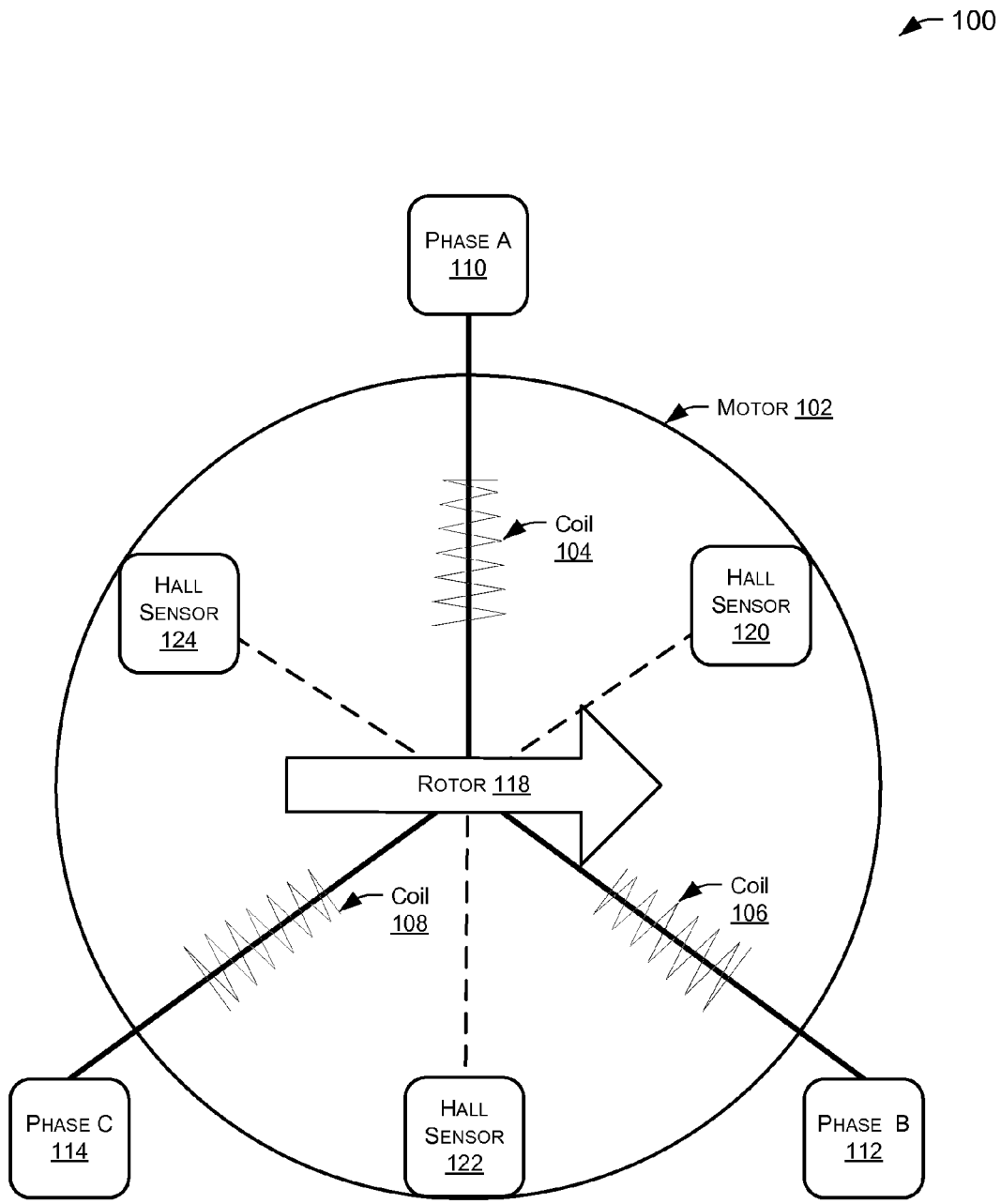
FIG. 1 schematically illustrates a simplified model of a multi-phase motor.
Figure 2:
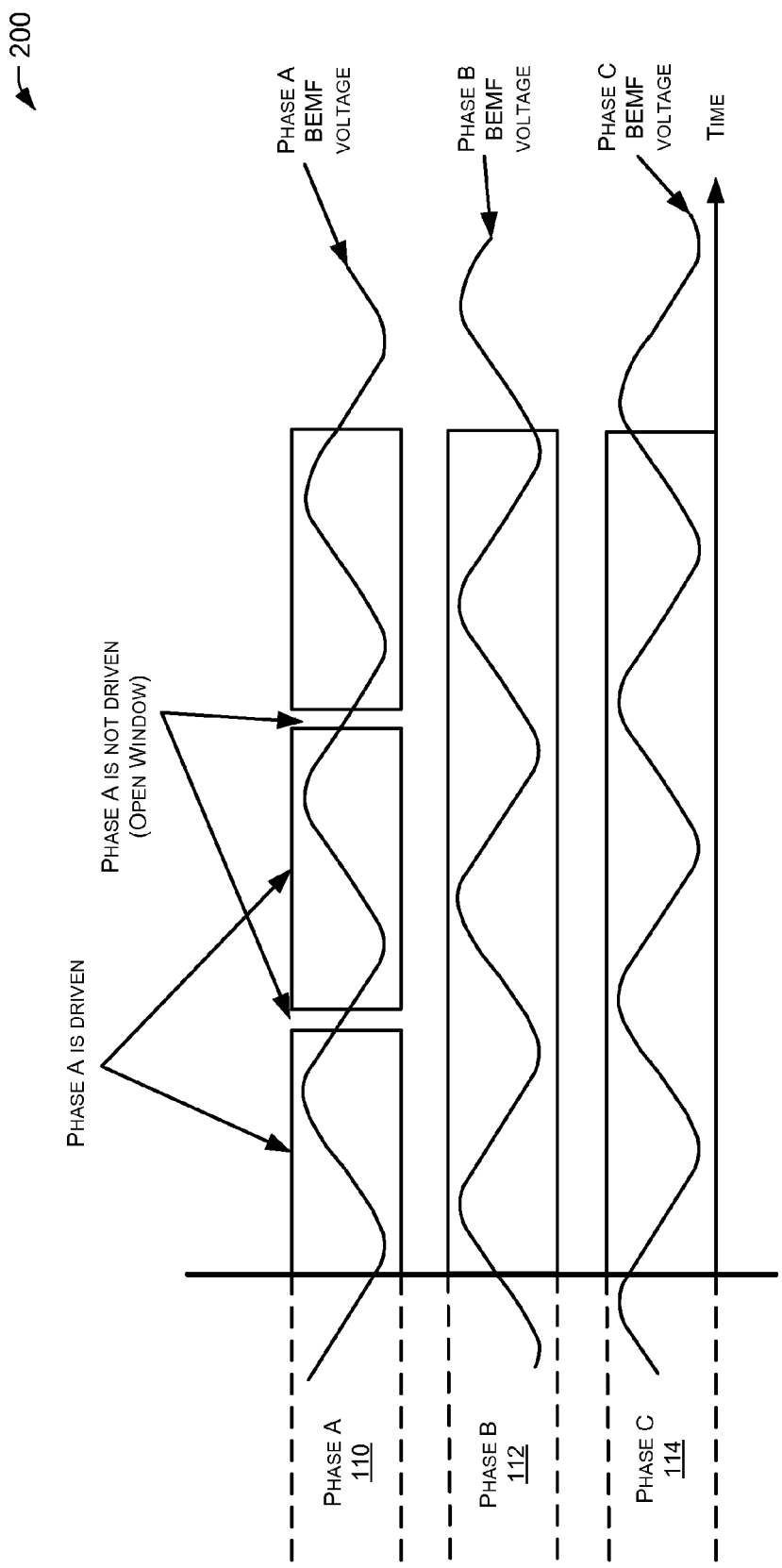
FIG. 2 illustrates an example windowed method of determining BEMF zero crossings in a multi-phase motor.

At 702, a terminal of a sensor-less motor is driven. For example, a terminal of a brushless sensor-less motor is continuously driven without opening a non-drive period. Referring to FIG. 2, each phase (e.g., terminal) of the motor is continuously driven, such as via PWM, without opening any windows to detect a BEMF zero crossing. The motor is driven such that the motor current waveform on each phase of the motor is sinusoidal (e.g., purely sinusoidal), which greatly reduces jitter and acoustic noise relative to driving a motor in a windowed fashion, as illustrated in FIG. 2. As an example, the circuit with logic illustrated in FIG. 4 is used to drive the motor.

At 704, a voltage level at a first threshold is detected at the terminal of a motor. As an example, a comparator 426 detects a voltage at a first threshold between V1 and V2 in time duration D as shown in FIG. 6.

At 706, at least one current flow switch connected to the terminal is switched at a first time. As an example, n-switch 412 is switched on as illustrated in time duration E in FIGS. 5 and 6. In this example, since control logic 402 determines that Vout 414 has risen above the first threshold, control logic 402 determines when to switch on n-switch 412 at the first time.

At 708, a voltage level at a second threshold is detected at the terminal of the motor at a second time. As an example, control logic 402 determines a beginning of time duration G, and switches off n-switch 412, driving Vout 414 below a second threshold between V5 and V6. In an embodiment, control logic 402 determines the beginning of time duration G when Vout 414 is at or near V5. In an alternate embodiment, control logic 402 determines the beginning of time duration G based on a duty cycle of a PWM driving signal that drives the terminal.

At 710, a zero crossing of a motor current waveform at the terminal of the motor is determined (e.g., at a known point) between the first time and the second time. As an example, by maintaining the first time and the second time, control logic 402 calculates (e.g., estimates) a time of the zero crossing of the motor current waveform. As an example, control logic 402 determines that the zero crossing is halfway, or some other known point, between the first time and the second time.

At 712, the driving of the terminal of the motor is synchronized based at least in part on the determined zero crossing. As an example, assuming an ideal 3 phase motor with a circuit 404 connected to each phase of the ideal motor, control logic 402 drives each phase of the motor such that the BEMF and motor current waveforms on each phase are sinusoidal and exactly 120 degrees apart on each phase of the ideal motor. If there is a pole to pole mismatch in the motor, since each phase of the motor is monitored and continuously driven, control logic 402 drives each phase of the motor to compensate for any pole-to-pole mismatch. If over time, for example, due to wear, a motor experiences a pole to pole mismatch, or a pole to pole mismatch changes, control logic 402 drives each phase of the motor to compensate for any change attributable to pole to pole mismatch.

As described herein, the driving of the terminal of the motor is synchronized based at least in part on the determined zero crossing because the zero crossing of the motor current waveform coincides with a zero crossing of a back electro-motive force (BEMF) voltage waveform at the terminal of the motor.

Additionally, as described herein, control logic 402 may switch off current flow switches p-switch 408 and n-switch 412 and determine a polarity of the motor current waveform based on whether Vout 414 rises above supply voltage Vs 416 (e.g., positive polarity), or goes below ground (e.g., negative polarity).

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," "circuit," and "module" may refer to, be part of, or include an Application Specific Integrated Circuit (ASIC), System-on-Chip (SoC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described. Rather, the specific features and acts are merely illustrative of some embodiments that fall within the scope of the claims of the present disclosure.

What is claimed is:

1. A circuit with logic for windowless motor current waveform detection in a sensor-less motor, the circuit comprising:
   a first current flow switch and a second current flow switch, wherein (i) a first end of the first current flow switch is coupled to a supply voltage, (ii) each of a second end of the first current flow switch and a first end of the second current flow switch is coupled to a first node, (iii) a second end of the second current flow switch is coupled to a ground voltage, and (iv) the first node is coupled to a terminal of the sensor-less motor; and
   a plurality of comparators, wherein the plurality of comparators comprises (i) a first comparator configured to compare the voltage level of the first node with a first positive threshold voltage and (ii) a second comparator configured to compare the voltage level of the first node with a second negative threshold voltage,
   wherein the logic is configured to:
      during a first time period, (i) determine that each of the first current flow switch and the second current flow switch is switched off, (ii) determine that the voltage level of the first node is higher than the first positive threshold voltage, and (iii) based on determining that (A) each of the first current flow switch and the second current flow switch is switched off and (B) the voltage level of the first node is higher than the first positive threshold voltage, determine that the current flow through the first node is positive,
      during a second time period, (i) determine that each of the first current flow switch and the second current flow switch is switched off, (ii) determine that the voltage level of the first node is lower than the second negative threshold voltage, and (iii) based on determining that (A) each of the first current flow switch and the second current flow switch is switched off and (B) the voltage level of the first node is lower than the second negative threshold voltage, determine that the current flow through the first node is negative, and
      determine that a zero crossing of the current flow through the first node occurs (i) subsequent to the first time period and (ii) prior to the second time period.

2. The circuit of claim 1, wherein the logic is further configured to drive the sensor-less motor in synchronization based at least in part on the determined zero crossing.

3. The circuit of claim 1, wherein:
   the sensor-less motor is a multi-phase motor;
   the terminal is a connection to a phase of the multi-phase motor; and
   the logic determines the zero crossing while driving the terminal of the multi-phase motor using pulse width modulation (PWM) without opening a non-drive period.

4. The circuit of claim 1, wherein the zero crossing of the current flow through the first node coincides with a zero crossing of a back electro-motive force (BEMF) voltage waveform at the terminal of the sensor-less motor.

5. The circuit of claim 1, wherein:
   the sensor-less motor is a multi-phase direct current (DC) brushless motor; and the terminal is associated with a phase of the sensor-less motor.

6. The circuit of claim 1, wherein the first current flow switch comprises at least one of a metal-oxide-semiconductor (MOS) transistor, a field-effect transistor (FET), a MOSFET, a p-type MOS (PMOS) transistor or an n-type MOS (NMOS) transistor.

7. The circuit of claim 1, wherein:
the first threshold is above a voltage level of a power supply of the circuit; and
the second threshold is at a negative voltage level.

8. The circuit of claim 1, wherein:
while the current flow through the first node is positive, the circuit transitions from (i) both the first current flow switch and the second current flow switch being switched off to (ii) the first current flow switch remaining switched off and the second current flow switch being switched on, the first current flow switch remaining switched off and the second current flow switch remaining switched on for a third time period;
the third time period starts at a first time and ends at a second time; and
the logic is further configured to determine that the zero crossing of the current flow through the first node motor current waveform at the terminal of the sensor-less motor occurs between the first time and the second time.

9. The circuit of claim 8, wherein the logic is further configured to determine that the zero crossing of the current flow through the first node motor current waveform at the terminal of the sensor-less motor occurs at a predetermined interval after the first time.

10. The circuit of claim 9, wherein the logic is further configured to:
determine a ratio of (i) a difference between the first time and the second time and (ii) a predetermined number;
determine the zero crossing of the current flow through the first node motor current waveform at the terminal of the sensor-less motor, based at least in part on the determined ratio.

11. A method comprising:
controlling switching of a first current flow switch and a second current flow switch, wherein (i) a first end of the first current flow switch is coupled to a supply voltage, (ii) each of a second end of the first current flow switch and a first end of the second current flow switch is coupled to a first node, and (iii) a second end of the second current flow switch is coupled to a ground voltage;
driving a terminal of a sensor-less motor using the voltage at the first node;
comparing the voltage level of the first node with a first positive threshold voltage;
comparing the voltage level of the first node with a second negative threshold voltage;
during a first time period, (i) determining that each of the first current flow switch and the second current flow switch is switched off, (ii) determining that the voltage level of the first node is higher than the first positive threshold voltage, and (iii) based on determining that (A) each of the first current flow switch and the second current flow switch is switched off and (B) the voltage level of the first node is higher than the first positive threshold voltage, determining that the current flow through the first node is positive;
during a second time period, (i) determining that each of the first current flow switch and the second current flow switch is switched off, (ii) determining that the voltage level of the first node is lower than the second negative threshold voltage, and (iii) based on determining that (A) each of the first current flow switch and the second current flow switch is switched off and (B) the voltage level of the first node is lower than the second negative threshold voltage, determining that the current flow through the first node is negative; and
determining that a zero crossing of the current flow through the first node occurs (i) subsequent to the first time period and (ii) prior to the second time period.

12. The method of claim 11, further comprising synchronizing the driving of the terminal of the sensor-less motor based at least in part on the determined zero crossing.

13. The method of claim 11, wherein the zero crossing of the current flow through the first node coincides with a zero crossing of a back electro-motive force (BEMF) voltage waveform at the terminal of the sensor-less motor.

14. The method of claim 11, wherein the driving the terminal uses pulse width modulation (PWM) causing the motor current waveform at the terminal of the sensor-less motor to be sinusoidal.

15. The method of claim 11, further comprising:
while the current flow through the first node is positive, detecting a transition from (i) both the first current flow switch and the second current flow switch being switched off to (ii) the first current flow switch remaining switched off and the second current flow switch being switched on, wherein the first current flow switch remains switched off and the second current flow switch remains switched on for a third time period, wherein the third time period starts after an end of the first time period, and wherein the third time period ends before a beginning of the second time period,
wherein determine the zero crossing comprises
determining that the zero crossing of the current flow through the first node motor current waveform at the terminal of the sensor-less motor occurs (i) after a start of the third time period, and (ii) before an end of the third time period.

16. The method of claim 11, wherein determining the zero crossing further comprises:
determining that the zero crossing of the current flow through the first node motor current waveform at the terminal of the sensor-less motor occurs at a predetermined interval after the first time.

17. The method of claim 16, wherein determining the zero crossing further comprises:
determining a ratio of (i) a difference between the first time and the second time and (ii) a predetermined number; and
determining the zero crossing of the current flow through the first node motor current waveform at the terminal of the sensor-less motor, based at least in part on the determined ratio.

* * * * *